United States Patent
Mitterhumer et al.

(10) Patent No.: US 8,455,785 B2
(45) Date of Patent: Jun. 4, 2013

(54) WATER-VAPOR PLASMA TORCH, AND WEAR-DETECTION AND PROCESS-CONTROL METHOD TO BE USED WITH SUCH A WATER-VAPOR PLASMA TORCH

(75) Inventors: Walter Mitterhumer, Pettenbach (AT); Heribert Pauser, Grafenwörth (AT)

(73) Assignee: Fronius International GmbH, Pettenbach (AT)

(*) Notice: Subject to any disclaimer, the term of this patent is extended or adjusted under 35 U.S.C. 154(b) by 1137 days.

(21) Appl. No.: 12/310,410

(22) PCT Filed: Sep. 14, 2007

(86) PCT No.: PCT/AT2007/000438
§ 371 (c)(1),
(2), (4) Date: Feb. 24, 2009

(87) PCT Pub. No.: WO2008/031132
PCT Pub. Date: Mar. 20, 2008

(65) Prior Publication Data
US 2009/0200276 A1    Aug. 13, 2009

(30) Foreign Application Priority Data
Sep. 15, 2006 (AT) .................... A 1546/2006

(51) Int. Cl.
B23K 10/00 (2006.01)
(52) U.S. Cl.
USPC ........... 219/121.44; 219/121.48; 219/121.54; 219/121.52; 219/121.39
(58) Field of Classification Search
CPC ....................................... B23K 10/00
USPC ............ 219/121.36, 121.52, 121.39, 121.48, 219/121.44, 75
See application file for complete search history.

(56) References Cited

U.S. PATENT DOCUMENTS

| | | | |
|---|---|---|---|
| 4,681,025 A * | 7/1987 | Carty | 454/44 |
| 5,717,187 A | 2/1998 | Rogozinski et al. | |
| 5,756,960 A | 5/1998 | Rogozinski et al. | |
| 6,326,581 B1 | 12/2001 | Laimer et al. | |

(Continued)

FOREIGN PATENT DOCUMENTS

| | | |
|---|---|---|
| DE | 197 56 445 | 2/1999 |
| EP | 0 902 606 | 3/1999 |

(Continued)

OTHER PUBLICATIONS
International Search Report.

*Primary Examiner* — Mark Paschall
(74) *Attorney, Agent, or Firm* — Collard & Roe, P.C.

(57) ABSTRACT

The invention relates to a water-vapor plasma torch (7) for cutting a workpiece (21), comprising a feed line (8) for a liquid (9), a heating device (22), and an evaporator (23) for forming a gas (20) from the liquid (9), a cathode (24) detachably connected to a movably mounted piston rod (25), and a nozzle (26) with an outlet opening (27) for the gas (20), as well as to a wear-detection and process-control method to be used with such a water-vapor plasma torch (7). To create such a water-vapor plasma torch (7) including wearing-part detection, at least one temperature sensor (28) is arranged within the piston rod (25), said temperature sensor being connected to a control unit (4), so that a wear of the cathode (24) and the nozzle (26) can be concluded from the temperature values detected, and that the control of the water-vapor plasma cutting process is influenceable.

23 Claims, 4 Drawing Sheets

U.S. PATENT DOCUMENTS

| | | | |
|---|---|---|---|
| 6,447,837 B2 * | 9/2002 | Plester et al. | 427/8 |
| 2004/0195218 A1 | 10/2004 | Tao et al. | |
| 2007/0215068 A1 | 9/2007 | Langeder et al. | |

FOREIGN PATENT DOCUMENTS

| | | |
|---|---|---|
| EP | 1 522 371 | 4/2005 |
| EP | 1 522 372 | 4/2005 |
| EP | 1 686 843 | 8/2006 |
| JP | 62-127173 | 6/1987 |
| JP | 11-047940 | 2/1999 |
| RU | 2 041 039 | 8/1995 |
| WO | WO 99/38365 | 7/1999 |
| WO | WO 2005/110659 | 11/2005 |

* cited by examiner

WATER-VAPOR PLASMA TORCH, AND WEAR-DETECTION AND PROCESS-CONTROL METHOD TO BE USED WITH SUCH A WATER-VAPOR PLASMA TORCH

CROSS REFERENCE TO RELATED APPLICATIONS

This application is the National Stage of PCT/AT2007/000438 filed on Sep. 14, 2007, which claims priority under 35 U.S.C. §119 of Austrian Application No. A 1546/2006 filed on Sep. 15, 2006. The international application under PCT article 21(2) was not published in English.

BACKGROUND OF THE INVENTION

1. Field of the Invention

The invention relates to a water-vapor plasma torch for cutting a workpiece, comprising a feed line for a liquid, a heating device, and an evaporator for forming a gas from the liquid, a cathode detachably connected to a movably mounted piston rod, and a nozzle with an outlet opening for the gas.

The invention further relates to a method of detecting the wear of the cathode of a water-vapor plasma torch during and after a cutting process, with said cathode being detachably connected with a piston rod, wherein the heat generated by an electric arc is thermally coupled into the piston rod connected with the cathode so that when the temperature changes at the cathode, the temperature within the piston rod will also change.

Moreover, the invention relates to a method of detecting the wear of the anode of a water-vapor plasma torch, said anode being designed as a nozzle with an outlet opening, wherein a gas escapes through the outlet opening formed by evaporation of a liquid, fed via a feed line, by means of a heating device, and an evaporator, wherein the nozzle is worn out by enlarging the outlet opening, thus increasing the flow rate of the liquid.

Likewise, the invention relates to a method of controlling a cutting process conducted by means of a water-vapor plasma torch, wherein a liquid is fed to the torch via a feed line, and wherein the liquid is evaporated into a gas by means of a controlled heating device and an evaporator.

2. The Prior Art

From the prior art, in particular from EP 1 522 371 A1, it is known to arrange a plurality of sensors in a plasma torch which detects the temperature or voltage, e.g. Here, the individual sensors are connected to a processor in the plasma torch which, in turn, is connected to the processor in the current source via a data line. Thus, the cutting process can be controlled based on the measurement values provided by the sensors.

Here, it is disadvantageous that the size of the plasma torch increases with each sensor installed therein, and with the integration of the processor and the electronics associated therewith. This makes the handling of the plasma torch at least partially more difficult. Likewise, the risk of interference is increased by using sensitive electronics in the plasma torch. Furthermore, no technical solution for wear detection is described in EP 1 522 371 A1.

Moreover, it is known from the prior art to control the temperature of an evaporator, which evaporates liquid, in a torch of a water-vapor cutting device.

Here, it is disadvantageous that the heat introduced into a cathode via the electric arc may influence the temperature control of the evaporator in an unpredictable manner since the heat introduced by the cathode is not taken into consideration when controlling the temperature of the evaporator. Thus, the torch may possibly be overheated and destroyed.

SUMMARY OF THE INVENTION

The object of the invention is to create a water-vapor plasma torch which allows for an automatic wear detection, in particular of a cathode and an anode, as well as for process-control improvement, in particular control for evaporating the liquid operational medium.

Further objects of the invention reside in creating a wear-detection method to be used with a water-vapor plasma torch, as well as in a process-control method to be used with such a water-vapor plasma torch.

The first object of the invention is achieved in that at least one temperature sensor is arranged within the piston rod, said at least one temperature sensor being connected to a control unit so that a wear of the cathode and the nozzle can be concluded from the temperature values detected, and that the control of a water-vapor plasma cutting process is influenceable. The temperature detected by at least one of the temperature sensors arranged within the piston rod enable the control unit to evaluate the temperature changes, and the cathode wear of the water-vapor plasma torch can be concluded from the temperature changes.

If a flow-rate sensor is additionally provided for measuring the flow rate of the liquid in the feed line, the nozzle wear can be concluded from the flow-rate change. Moreover, the heating output of the heating device can be detected, and the nozzle wear of the torch can be concluded from the heating output adapted to the flow-rate through the nozzle.

What is essential here is that the function of the water-vapor plasma torch is not affected by the at least one temperature sensor. The integration of the temperature sensor does not increase the structural size of the water-vapor plasma torch either, thus not negatively influencing handling thereof. Thanks to the wear detection the control unit is substantially permanently informed about the state of the wearing parts, i.e. cathode and nozzle, thus allowing for the wearing parts to be used until they have been completely worn out. Of course, a constant quality of the cutting process is safeguarded here. The wear can be correspondingly displayed to the user of the water-vapor plasma torch so that a change of the worn-out parts will be recognized in time. This substantially minimizes the risk of the water-vapor plasma torch being destroyed, e.g. by overheating, thus substantially prolonging the service life of the torch. Moreover, thanks to the early wear detection it is achieved in an advantageous manner that the stability and the quality of the cutting process will not be affected.

The temperature detection of the piston rod allows for the heat balance in the water-vapor plasma torch to be controlled in a substantially better and faster manner so that the liquid operational medium will be completely evaporated already at minimum required heating output. Thus, an overheat of the water-vapor plasma torch can be substantially excluded, whereby the service life of the torch is substantially prolonged. Accordingly, the temperature of the torch is monitored by the inventive temperature sensor so that the control unit can interrupt the cutting process when a certain temperature threshold is reached.

The features of an embodiment of the invention ensure a precise detection of the piston-rod temperature.

By the measures of another embodiment it is advantageously achieved that the function of the piston rod, in particular its movement, will not be restricted.

According to another embodiment, it is achieved in an advantageous manner that the heat balance of the water-vapor plasma torch can be controlled in a precise manner.

The measure of another embodiment is also of advantage since it allows for a stable electric arc to be reached for the cutting process.

By the measure of another embodiment it is advantageously achieved that the point of time when the wearing parts are to be exchanged is displayed to the user in a visual manner.

The object of the invention is also achieved by an above-mentioned method of detecting the wear of the cathode of the water-vapor plasma torch, wherein the temperature within the piston rod is detected by at least one temperature sensor arranged within the piston rod, and wherein the temperature change is evaluated by a control unit connected with the temperature sensor, and the temperature change will be consulted as a measure for the wear of the cathode. Here, it is advantageous that the necessary pre-heating time of the torch can be precisely adapted to the respective ambient conditions and be thus kept as short as possible. Likewise, it is advantageous that the dynamic behavior of the torch can thus be substantially improved since the information on a temperature change is available to the control unit at an earlier point of time via the temperature sensor of the cathode.

The object of the invention is also achieved by an above-mentioned method of detecting the cathode wear, wherein the temperature within the piston rod is detected by at least one temperature sensor arranged within the piston rod, and wherein the temperature change is evaluated by a control unit connected with the temperature sensor, and the temperature change will be consulted as a measure for the wear of the cathode.

The inventive object is also achieved by an above-mentioned method of detecting the nozzle wear of a water-vapor plasma torch, wherein the flow rate of the liquid is measured in the feed line, and wherein the change in the flow rate is consulted as a measure for the wear of the nozzle.

Likewise, the output of the heating element can be detected, and the heating output which is a function of the flow rate of the liquid can be consulted when assessing wear of the nozzle.

The inventive object is also achieved by an above-mentioned control method of a cutting process conducted by means of a water-vapor plasma torch, wherein the temperature within a piston rod of the torch is detected by at least one temperature sensor arranged within the piston rod, and wherein the heating device is controlled as a function of the temperature within the piston rod in a manner to ensure the complete evaporation of the liquid fed via the feed line.

The measures of another embodiment allow for the heating device to be controlled only in case of a properly turned-on torch so that no life-threatening voltage can apply between the cathode and the nozzle and/or between the cathode and the workpiece when the torch is disassembled.

Further advantages of the invention can be learned from the description.

BRIEF DESCRIPTION OF THE DRAWINGS

The present invention will be explained in more detail by way of the enclosed schematic drawings. Therein.

DETAILED DESCRIPTION OF THE PREFERRED EMBODIMENTS

Initially, it is pointed out that same parts of the exemplary embodiment are designated by same reference numbers.

Figure 1:
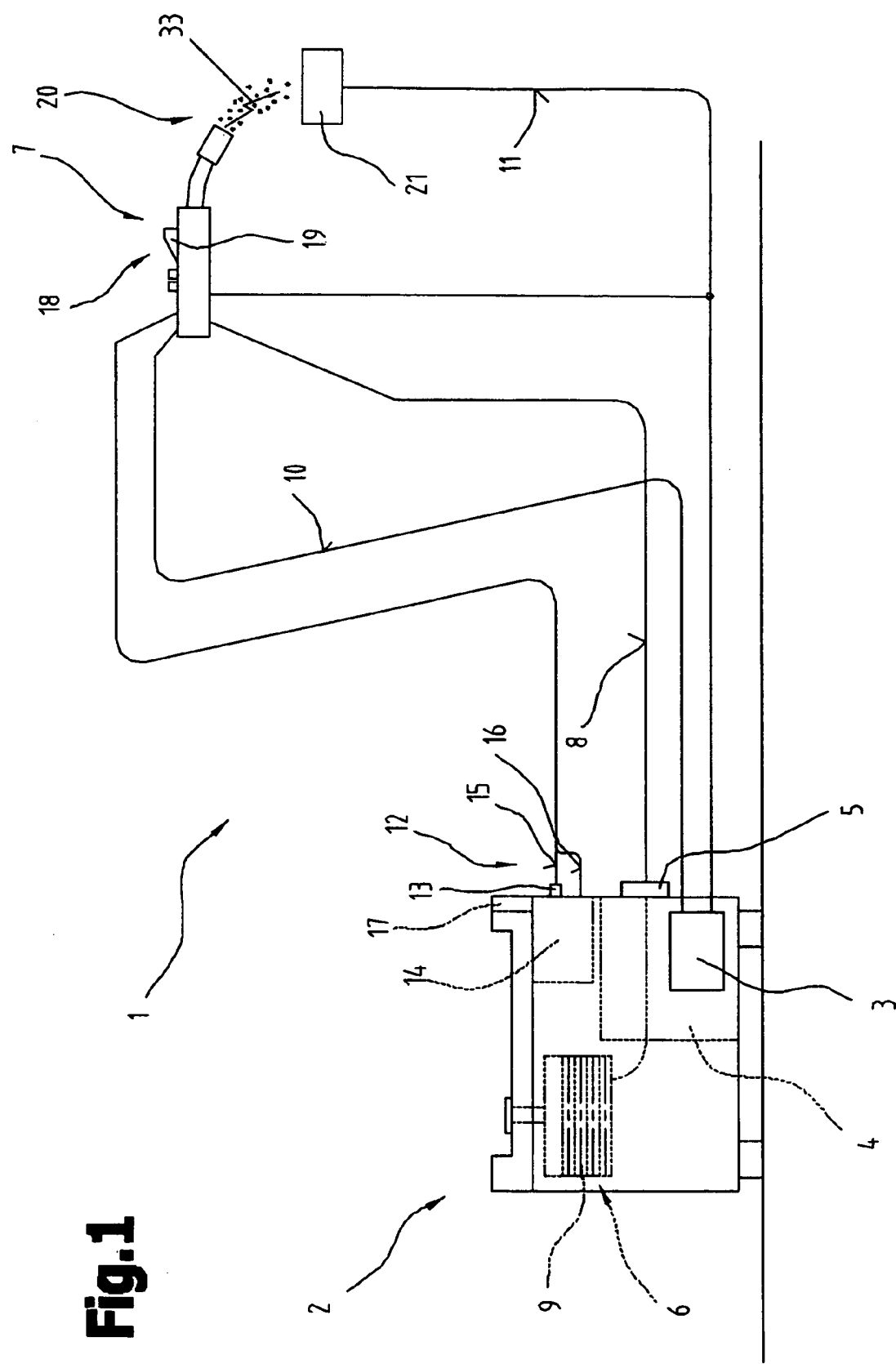
FIG. 1 shows an exemplary representation of a water-vapor cutting device.

FIG. 1 shows a water-vapor cutting device 1 with a basic unit 2 for a water-vapor cutting process. The basic unit 2 comprises a current source 3, a control unit 4, and a blocking element 5 assigned to the control unit 4. The blocking element 5 is connected to a reservoir 6 and a water-vapor plasma torch 7 via a feed line 8 so that the water-vapor plasma torch 7 can be supplied with a liquid medium or liquid 9 present in the reservoir 6. The water-vapor plasma torch 7 is supplied with electric energy via lines 10, 11 which are connected to the current source 3.

To provide cooling of the water-vapor plasma torch 7, the same is connected to a liquid reservoir 14 via a cooling circuit 12, with a flow control 13 being possibly interposed. When the torch 7 or the water-vapor cutting device 1 is put into operation, the control unit 4 can initiate the cooling circuit 12, thus achieving a cooling of the torch 7 via the cooling circuit 12. To create a cooling circuit 12, the torch 7 is connected to the liquid reservoir 14 via cooling lines 15, 16.

Furthermore, the water-vapor cutting device 1 may include an input and/or output unit 17 via which the most different parameters and operational modes of the water-vapor cutting device 1 can be set and displayed. The parameters set via the input and/or output unit 17 are forwarded to the control unit 4 which appropriately activates the individual components of the water-vapor cutting device 1.

Moreover, the water-vapor plasma torch 7 may include at least one operational element 18, in particular a pushbutton 19. Via the operational element 18, in particular via the pushbutton 19, the user can inform the control unit 4 of the torch 7 that a water-vapor cutting process shall be started and/or conducted by activating or deactivating the pushbutton 19. Furthermore, e.g. presettings can be adjusted via the input and/or output unit 17, in particular as regards the material to be cut, the liquids used, and, for example, the characteristic curves of the current and the voltage can be predefined, e.g. Of course, further operational elements can be provided on the torch 7 via which one or several operational parameters of the water-vapor cutting device 1 are set. To this end, these operational elements can be connected to the water-vapor cutting device 1, in particular to its control unit 4, directly via lines or a bus system.

After the pushbutton 19 has been actuated, the control unit 4 activates the individual components necessary for the water-vapor cutting process. For example, a pump (not illustrated), the blocking element 5, and the current source 3 are activated first, thus introducing a supply of the torch 7 with the liquid 9 via the feed line 8, as well as the electric-energy supply. Subsequently, the control unit 4 will activate the cooling circuit 12 so as to allow for a cooling of the torch 7. Of course, the supply of the torch 7 with the liquid 9 can also be ensured by the cooling of the torch 7 since the liquid 9 is heated to the temperature necessary for the cutting process only in the torch 7. As a logical consequence, the cooling circuit 12, which comprises the flow control 13, the liquid reservoir 14 and the cooling lines 15, 16, could be omitted. By the measure of supplying the torch 7 with the liquid 9 and with electric energy, the liquid 9 is converted into a gas 20, in particular plasma, in the torch 7 now by employing appropriately high temperatures. A cutting process can be conducted on a workpiece 21 by using the gas 20 escaping from the torch 7. Here, the liquid 9 is converted into the gas 20 at least by the aid of a heating device 22 preferably comprised of an appropriate heating element, and by the aid of an evaporator 23 preferably integrated into the torch 7.

Figure 2:
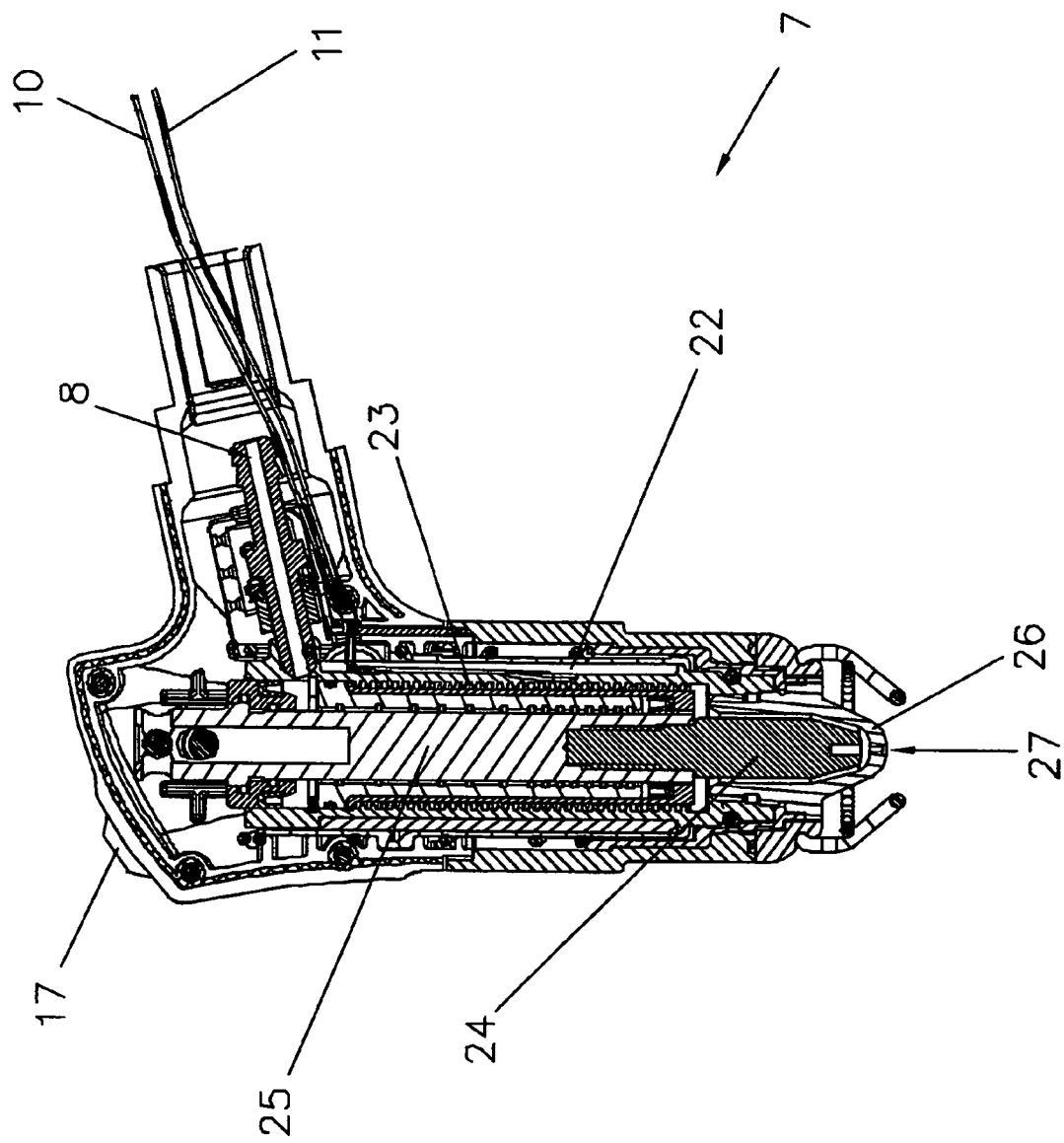
FIG. 2 shows a cross-section through an embodiment of a water-vapor plasma torch.

An electric arc 33 is additionally required for a cutting process on a workpiece 21 with a torch 7, illustrated in detail in FIG. 2. The electric arc 33 is ignited by the control unit 4 and by actuating the pushbutton 19, and it burns between a cathode 24, which is connected to the piston rod 25, thus being integrated in the torch 7, and which preferably is connected with the negative pole of the current source 3, and an anode, which is formed by a nozzle 27 and connected with the positive pole of the current source 3. When the torch 7 approximates to the workpiece 21, the positive pole of the current source 3 is switched off of the nozzle 26, whereby the electric arc 33 will correspondingly be forced outwards by the gas 20 through the outlet opening 27 in the nozzle 26, thus burning between the cathode 24 and the workpiece 21. To this end, the workpiece 21 is connected with the positive pole of the current source 3. That is, when the electric arc 33 is burning between the cathode 24 and the workpiece 21, the control unit 4 increases the current appropriately, finally producing a plasma jet of an energy density which is high enough for melting-on, which is why it can be used for cutting workpieces 21.

When separating the workpiece 21 by the aid of a water-vapor plasma torch 7, many components, in particular the cathode 24 and the nozzle 26, are subjected to very high temperatures, and to a very high current, thus exhibiting great wear. The quality of the cutting process strongly depends on the degree of wear of the wearing parts. Consequently, a wear detection integrated into the torch 7 is advantageous for quality control.

According to the invention, the wear is detected via at least one temperature sensor 28 integrated into the piston rod 25. The temperature sensor 28 transmits the temperature detected preferably to the control unit 4 which is capable of drawing conclusions as to the wear of the wearing parts from the temperature changes. Such a wear detection also allows for the torch 7 to be prevented from thermal overload.

Figure 3:
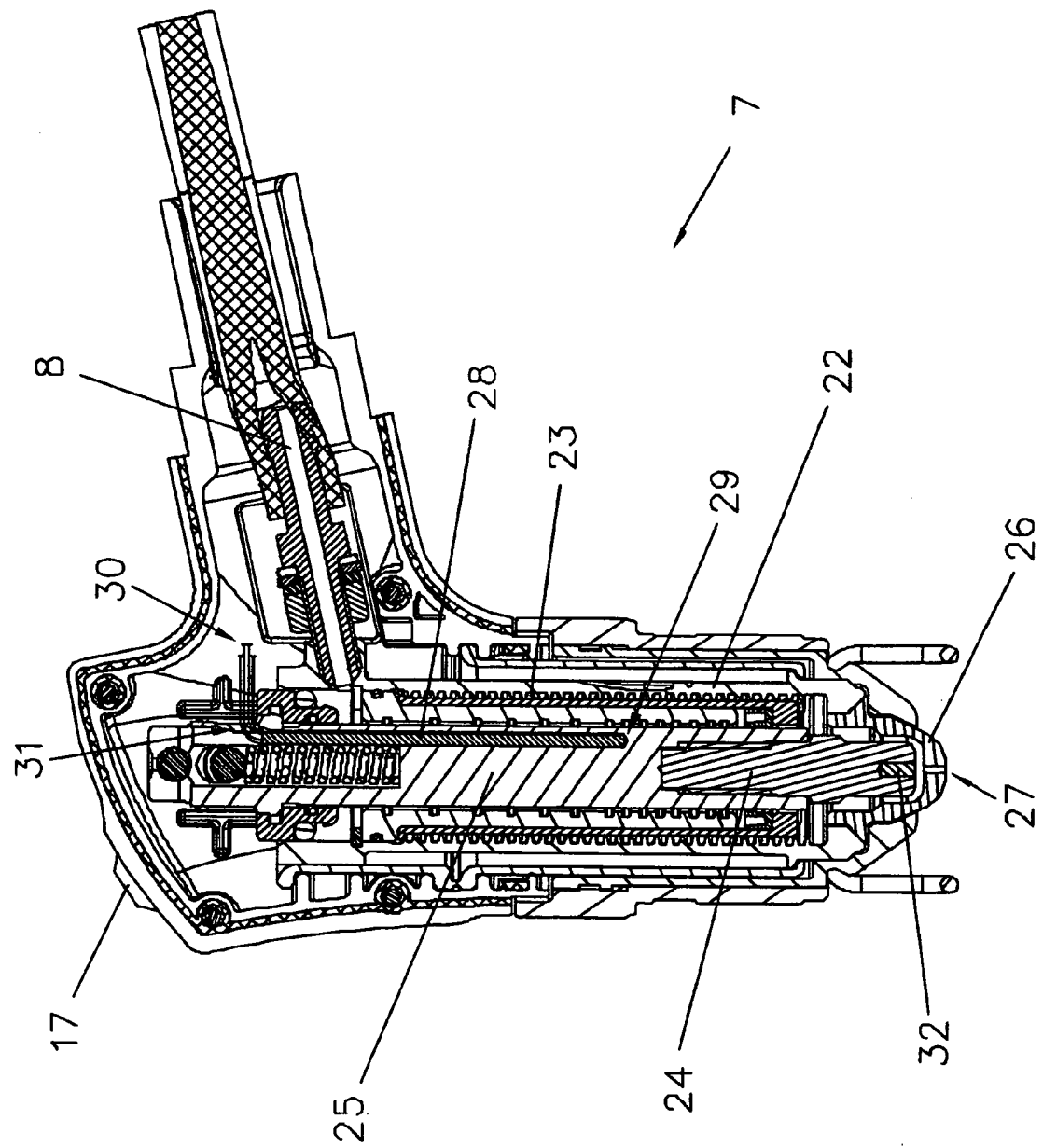
FIG. 3 shows a cross-section through a water-vapor plasma torch which includes an inventive temperature sensor within the piston rod.

In FIG. 3, a torch 7 is shown which includes the inventive temperature sensor 28 within the piston rod 25. The piston rod 25, and thus also the cathode 24, are movably mounted within the torch 7. This is why it is necessary for the temperature sensor 28 to be arranged within the substantially cylindrical piston rod 25 such that it will not restrict movement of the piston rod 25, and of the cathode 24 connected therewith. For this reason, the temperature sensor 28 is preferably rod-shaped. Preferably, the temperature sensor 28 is comprised of a semiconductor resistance, for example a PTC (positive-temperature-coefficient) resistance, e.g. a PT100. Likewise, it is also possible to select a resistance with a negative temperature coefficient, a so-called NTC (negative-temperature-coefficient) resistance. Certainly, the temperature sensor 28 may also be comprised of a thermal element or the like.

For receiving the temperature sensor 28 within the piston rod 25, the latter has a recess 29 or bore whose form corresponds to that of the temperature sensor 28. The recess 29 is provided in the edge region of the piston rod 25 so that the space for the elements necessary for movement of the piston rod 25 (e.g. a spring) will not be limited. Furthermore, the recess 29 extends preferably in parallel to the longitudinal axis of the piston rod 25, and substantially as far as to the cathode 24. Preferably, the temperature sensor 28 is clamped, or pressed, into the recess 29 and, optionally, glued thereto.

To allow the temperature sensor 28 to transfer the temperature detected to the control unit 4, the temperature sensor 28 comprises electric connections 30. In the region of the piston-rod mounting, these connections 30 are fed outwards through a passage 31 opposite the cathode 24, and can be connected to the control unit 4. Of course, the passage 31 is no hindrance for the movably mounted piston rod 25.

According to the invention, the wear of the cathode 24 and the nozzle 26 can now be detected with a such arranged temperature sensor 28 only.

The wear detection of the cathode 24 can be effected as follows.

During a cutting process, the electric arc 33 necessary therefor is burning between the cathode 24 and the workpiece 21. Preferably, the electric arc 33 forms in the center of the contact surface of the cathode 24, wherein, at this site, a pin or bolt 32, e.g. made of hafnium, is pressed into the cathode 24. The electron-emitting properties of hafnium, or, for example, also of zirconium or the like, cause the electric arc 33 to apply directly to the bolt 32. This ensures a stable electric arc 33 for the cutting process. Yet, the bolt 32 is increasingly worn out when the torch 7 or water-vapor cutting device 1 is in continuous operation, and a deeper weld penetration is caused in the bolt 32 by the electric arc 33, thus coupling more power or heat into the cathode 24. Since the cathode 24 is thermally connected with the piston rod 25, i.e., for example, by means of a screw connection, a corresponding temperature increase results within the piston rod 25. This temperature increase, e.g. of from about 160° C. to about 180° C., is detected via the temperature sensor 28 and the control unit 4. The corresponding reference data and reference values for the temperature increase are deposited in the control unit 4 so as to allow for the wear of the cathode 24 to be concluded from the temperature increase. Since the temperature detected by the temperature sensor 28 depends at least partially on the position of the temperature sensor 28, two or more temperature sensors 28, for example, may be arranged within the piston rod 25. The control unit 4 may generate, e.g., a mean value from all temperature values detected, enabling a precise conclusion as to the wear of the cathode 24.

The reference data in the control unit 4 may also include, e.g., information on the period of time during which the temperature increases as a function of the set current strength. If the temperature increases quickly in a relatively short period of time, this means a strong wear of the cathode 4. This is the case, e.g., when the temperature increases by 7° C. to 10° C. at a cutting period of 60 min.

Likewise, a temperature threshold can be deposited as a reference value in the control unit 4, wherein the cutting process will be stopped for the sake of the torch 7 when said threshold has been exceeded so as to allow for the torch 7 to be cooled by means of the liquid 9. Thus, the control unit 4 may take the appropriate measures for safeguarding the quality of the cutting process as well as for preventing the torch 7 from overheat. For example, the current for the cutting process may be reduced, the wear may be correspondingly displayed on the input and/or output unit 17 at the torch 7, indicating a necessary cathode change to the user, or the cutting process may be stopped.

A further possibility of detecting a worn-out cathode 24 is to evaluate the temperature increase of the piston rod 25 after a cutting process. According to the invention, this is achieved via the temperature sensor 28 provided within the piston rod 25.

During a cutting operation there is a heat gradient from the tip of the cathode 24 to the opposite end of the piston rod 25. This is the case since the cathode 24 is heated up by the electric arc 33, with the piston rod 25 being cooled by means of the liquid 9. Accordingly, the cathode 24 will no longer be heated up after a cutting process, and the piston rod 25 will no longer be cooled, thus levelling off or adapting the heat gradient. Thus, after a cutting process, the temperature of the piston rod 25 increases by the heat stored in the cathode 24. This can be detected by a temperature sensor 28, and be evaluated by the control unit 4, wherein the temperature increase may also be evaluated as a function of time. This allows for the wear of the cathode 24 to be inventively concluded.

Figure 4:
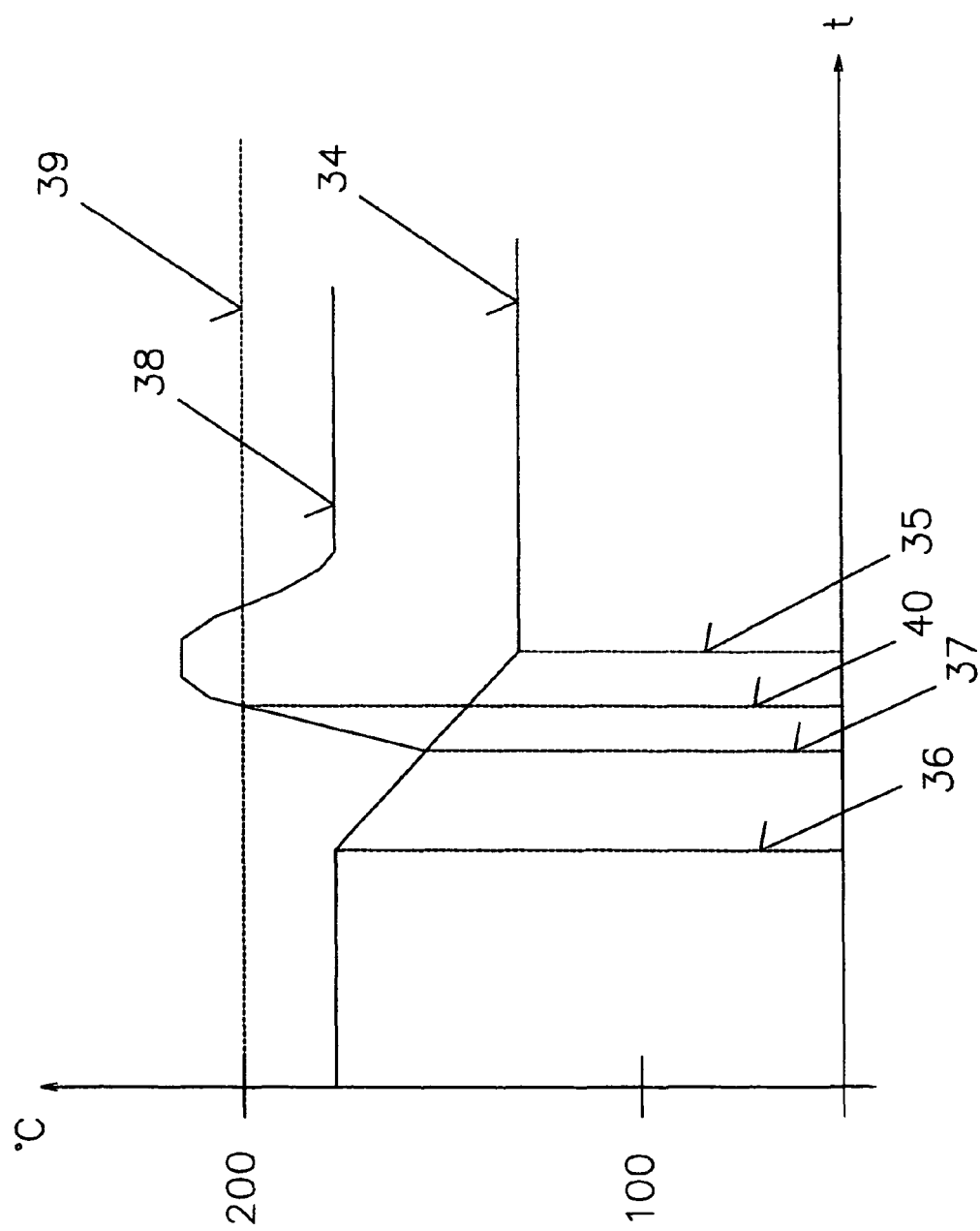
FIG. 4 shows an example of the temperature time course at the piston rod for detecting the cathode wear from the temperature change after completion of the welding process.

Such an evaluation is particularly done after short cutting processes, lasting less than 10 sec, e.g. This is required since the temperature relations between the evaporator 23, the cathode 24, and the piston rod 25, will adjust after a certain period of time only, e.g. after about 10 sec, so that the wear can be efficiently detected during a cutting operation only from this point of time on, as described above. It is apparent from the time course of the temperature 34 at the piston rod 25 according to FIG. 4 that the wear can be detected efficiently only from point of time 35 on. This is why the temperatures in the water-vapor plasma torch 7 are generally higher in case of a short cutting process so that the reference values of the wear detection during a cutting operation, within a period of about the first ten seconds of the cutting process, are too low to detect the wear and/or the control unit 4 would stop the cutting process due to overheat. These increased temperatures are to be attributed to the fact that the water-vapor plasma torch 7 has a temperature, e.g., of about 190° C. during idling or standby. When pushing the pushbutton 19 at point of time 36, starting the cutting process, the piston rod 25 will be cooled, and the cathode 24 will be heated up by the electric arc. Only if the cutting process is stopped after about 10 seconds at point of time 37, the piston rod 25 will have a temperature, e.g., of about 180° C., and the cathode 24 will have been heated up to 300° C. As already known, the heating-up of the cathode 24 depends on its wear, and the heat stored in the cathode 24 will be coupled into the piston rod 25 after switching-off. Due to the temperature difference of about 120° C. the piston rod 25 may now be heated up to 200° C., at least for a short term, as can be seen in the temperature course 38, whereupon the idling temperature, e.g. of about 190° C., will again adjust. Such a temperature behavior is known as a so-called "temperature overshoot". When a threshold value 39 is defined in this temperature region and deposited in the control unit 4, a wear of the cathode 24 can be detected only in case the threshold value 39 has been exceeded once or several times. When the temperature sensor 28 measures that the threshold value 39 has been exceeded—as can be seen at point of time 40, e.g.—this serves as a measure for a cathode 24 which is at least starting to wear out. This is why several successive exceedances, i.e. one exceedance with each short cutting process, is preferably necessary for activating wear-displaying.

Preferably, in addition to monitoring the threshold value 39, the slope of the temperature increase, i.e. the change of the temperature as a function of time, is evaluated. To this end, a timer is started, e.g. when the cutting process is stopped, which has only an effect on wear detection when the threshold value 39 has been exceeded. In this case, the time required for reaching the threshold value 39 will be taken into consideration when detecting wear. When the threshold value 39 has been exceeded very quickly, this is taken as an indication for an already very strong worn-out cathode 24, whereas when the threshold value 39 has been exceeded more slowly, this is taken as an indication for an only slightly worn-out cathode 24. The corresponding comparative values may be deposited in the control unit 4.

The threshold value 39, and the comparative values, may be appropriately adapted to the dimensions of the cathode 24 and/or the piston rod 25, i.e. the power class of the water-vapor plasma torch 7.

The combination of wear detections during a cutting process and after a short cutting process allows for the user to provide information on the state of the cathode 24, preferably via the wear display, at any time.

Wear detection of the nozzle 26 may be effected as follows.

The outlet opening 27 of the nozzle 26 becomes more and more worn-out when the number of cutting processes increases, whereby the diameter of the outlet opening 27 is widened and/or a weld puddle is formed around the outlet opening 27, shortening the channel length of the same. This, in turn, means that the amount of the gas 20 escaping from the outlet opening 26 will be correspondingly increased. This results in that correspondingly more liquid 9 will be fed to the torch 7, which liquid has to be evaporated in the same period of time. A correspondingly higher heating output of the heating device 22 is necessary for evaporating a larger amount of liquid 9. According to the invention, the heating output is controlled as a function of the temperature detected by the temperature sensor 28, as will be described in more detail below. The heating output is directly proportional to the diameter of the outlet opening 27 of the nozzle 26. Thus, the control unit 4 can draw conclusions as to the wear of the nozzle 26 from the heating output, and take appropriate measures, as described above.

A further possibility of detecting the wear of the nozzle 26 is to integrate a flow-rate sensor (not illustrated) into the feed line 8 of the liquid 9. This flow-rate sensor provides corresponding data to the control unit 4 which can draw conclusions as to the wear of the nozzle 26 from the increase in the flow rate. As known, the wear of the nozzle 26 depends, however, on many factors, e.g. heating output, current strength, nozzle diameter, gas flow, etc., which factors the control unit 4 has to appropriately take into consideration when drawing conclusions as to the wear. Preferably, a nozzle 26 is regarded to be worn-out when the flow rate is higher than the nominal flow rate, or the nominal value for the flow rate, by about 60%. This is the case, e.g. at 15 ml/min.

Certainly, it is also possible to combine the wear detection via a flow-rate sensor with the wear detection via heating output, allowing for even more precise conclusions to be drawn as to the wear of the nozzle 26.

According to the invention, a temperature sensor 28 integrated into the piston rod 25 may also be used for improving the heating-output control system.

As known from the prior art, the liquid 9 serves for cooling the cathode 24 and/or the piston rod 25, thus prolonging their service life, on the one hand, and, in the vaporous state, the liquid 9 serves as a starting medium for the cutting process, on the other hand. At first, the liquid 9 circulates around the piston rod 25, and will thereafter be brought into the vaporous state in the evaporator 23 by supplying the heating device 22 with current.

To achieve a qualitatively high and stable cutting process, attention has to be paid that the liquid 9 is evaporated completely without overheating the torch 7. The inventive temperature sensor 28 within the piston rod 25 enables a precise control of the heating output of the heating device 22. This is of particular importance when a cutting process is being started with a completely cool torch 7 since in this case the risk of overheating the torch 7 or of a torch 7 with insufficient temperature is especially high. For conducting a cutting process, the evaporator 23 is heated up to a temperature of about 190° C. so as to allow for the liquid 9 to be completely evaporated. Here, it is a prerequisite that the piston rod 25, which is heated up by the electric arc 33 via the cathode 24, already pre-heats the liquid 9, as is the case during normal operation. When staring the cutting operation with a "cold" torch 7 and/or a "cold" piston rod 25, no pre-heating is necessary. Thus, the evaporator 23 would have to be heated up to a substantially higher temperature, increasing thermal load on the torch 7.

The risk that a torch 7 and/or an evaporator 23 has (have) been preheated insufficiently, causing insufficient temperature in the torch 7, is even more likely. Here, the evaporator 23 is provided with too cold a liquid 9 since the latter has not been pre-heated by the cold piston rod 25. To put it differently, the temperature of the evaporator 23 is too low since the latter has not received any information on the temperature of the piston rod 25 but which information is essential for pre-heating the liquid 9. Consequently, the temperature of the evaporator 23 is too low to evaporate the cold liquid 9 completely. This is why the liquid 9 accumulates in the region of the outlet opening 27 and/or escapes therefrom, having negative effects on the service life of the torch 7, and the wearing parts.

Accordingly, the inventive control, in particular for the starting procedure of the cutting process, is effected such that the temperature of the piston rod 25 detected by the temperature sensor 28 is transferred to the control unit 4. As a function of this temperature, the control unit 4 can detect how much the fed liquid 9 has already been pre-heated by the temperature of the piston rod 25. This results in the heating output necessary for the heating device 22 without putting the torch 7 at the risk of overheating. In case of too high a temperature of the piston rod 25, the heating device 22 is supplied with less power. In correspondence therewith, the heating device 22 is supplied with more power in case of too low a temperature of the piston rod 25. Additionally, more heat may be introduced into the piston rod 25 by selectively increasing the cutting current for a short time (e.g. by 10A), whereby the heating output is lower, thus allowing for a stable and continuous cutting process to be ensured. In addition, the flow rate or the pressure (e.g. by 1 bar) of the liquid 9 may be reduced for a short time, whereby less liquid 9 has to be evaporated, and, thus, a lower heating output is necessary.

Moreover, by means of the temperature sensor 28, it is also achieved that the torch 7 and/or the piston rod 25 always have the temperature necessary to appropriately heat up the liquid 9 for a stable cutting process. According to this, also a "cool" torch 7 can be detected which is of particular importance for the start of a cutting process.

As already mentioned, such a control is particularly important during the starting stages of the cutting process since in these cases a fast evaporation of the liquid 9 is necessary to safeguard a stable cutting process. The inventive control allows for the a stable cutting process to be ensured in each process stage by means of the at least one temperature sensor 28.

That is, the inventive temperature sensor 28 ensures the necessary, complete evaporation of the liquid 9 in each case so as to provide for a cutting process of optimum quality. A power element (not illustrated) integrated into the water-vapor cutting device supplies the current necessary for forming the electric arc 33. A so-called protective-cap monitoring means can be integrated into the torch 7 so as to allow for the electric arc 33 to be ignited in the assembled state of the torch 7 only for the sake of safety. Here, the power element can only be deblocked and/or the cutting process can only be started when a short-circuit has been detected between the cathode 24 and the nozzle 26. Such a short-circuit detection may be effected by means of a high-ohmic, low-volt voltage source.

Of course, the inventive wear detection, and the process control, may also include a separate control realized in a microcontroller or the like, e.g. Yet, the control is preferably effected centrally via the control unit 4. Since the wear, in particular of the cathode 24 and the nozzle 26, depends on other factors, e.g. heating output, current strength, nozzle diameter, gas flow, and the like, the control unit 4 may also take these factors into consideration when detecting the wear.

Here, a calibration is of advantage. In particular, tolerance limits, e.g. of the temperature sensor 28, or interpolations in the reference values, may interfere with the control in a certain manner. This is why the temperature sensor 28 is preferably calibrated, e.g. by calibration resistances, via which the influence of certain interference factors on the control can be eliminated or reduced, ensuring a precise control of the heating output of the torch 7.

The invention claimed is:

1. A water-vapor cutting device comprising a control unit and a water-vapor plasma torch for cutting a workpiece, said water-vapor plasma torch comprising a feed line for a liquid, a heating device connected to the control unit, and an evaporator for forming a gas from the liquid, a cathode detachably connected to a movably mounted piston rod, and a nozzle with an outlet opening for the gas, wherein at least one temperature sensor is arranged within the piston rod, said at least one temperature sensor being connected to the control unit so that a wear of the cathode and the nozzle can be concluded from an increase in temperature values detected, and that the control of a water-vapor plasma cutting process is influenceable.

2. The water-vapor cutting device according to claim 1, wherein the temperature sensor comprises a a PTC (positive-temperature-coefficient) resistance, or an NTC (negative-temperature-coefficient) resistance, or a thermal element.

3. The water-vapor cutting device according to claim 1, wherein the temperature sensor is arranged to be substantially parallel to the longitudinal axis of the piston rod.

4. The water-vapor cutting device according to claim 1, wherein the temperature sensor is arranged in the edge region of the piston rod.

5. The water-vapor cutting device according to claim 1, wherein the temperature sensor is rod-shaped and provided with connections.

6. The water-vapor cutting device according to claim 1, wherein a recess for the temperature sensor is provided within the piston rod.

7. The water-vapor cutting device according to claim 6, wherein the recess is designed in correspondence with the temperature sensor.

8. The water-vapor cutting device according to claim 7, wherein the temperature sensor is clamped into the recess.

9. The water-vapor cutting device according to claim 5, wherein the piston rod comprises a passage for the connections of the temperature sensor.

10. The water-vapor cutting device according to claim 5, wherein the connections are connected with the control unit.

11. The water-vapor cutting device according to claim 1, wherein a bolt is arranged on a contact surface of the cathode facing the workpiece.

12. The water-vapor cutting device according to claim 1, wherein the temperature sensor and/or the control unit are connected to a display for displaying the wear of the cathode and the nozzle.

13. A method of detecting the wear of the cathode of a water vapor plasma torch during a cutting process, with said cathode being detachably connected with a piston rod, wherein the heat generated by an electric arc is thermally coupled into the piston rod connected with the cathode so that when the temperature changes at the cathode, the temperature within the piston rod will also change, wherein the temperature within the piston rod is detected by at least one temperature sensor arranged within the piston rod, and wherein a temperature change is evaluated by a control unit connected with the temperature sensor so that an increase in temperature will be used as an indication of the wear of the cathode.

14. The wear-detection method according to claim 13, wherein the cutting time during the cutting process is considered when assessing wear of the cathode.

15. The wear-detection method according to claim 14, wherein the temperature values detected are compared with the temperature-change reference values stored in the control unit, as a function of cutting time.

16. The wear-detection method according to claim 13, wherein after a cutting process, the heat stored within the cathode is coupled into the piston rod, and taken into consideration as a function of time by the temperature change resulting therefrom, when assessing wear of the cathode.

17. The wear-detection method according to claim 16, wherein the temperature change detected after the cutting process as a function of time is compared with the temperature-change reference values stored in the control unit, as a function of time.

18. The wear-detection method according to claim 13 wherein the wear of the cathode is displayed on a display.

19. A method of detecting the wear of the cathode of a water-vapor plasma torch after a cutting process, with said cathode being detachably connected with a piston rod, wherein the heat generated by an electric arc and stored in the cathode is thermally coupled into the piston rod connected with the cathode so that when the temperature changes at the cathode, the temperature within the piston rod will also change, wherein the temperature within the piston rod is detected by at least one temperature sensor arranged within the piston rod, and wherein a temperature change is evaluated by a control unit connected with the temperature sensor so that an increase in temperature will be used as an indication of the wear of the cathode.

20. The method according to claim 19, wherein the temperature change is produced by a temperature increase, wherein the temperature increase is compared with a threshold value.

21. The method according to claim 19, wherein the slope of the temperature increase is evaluated by the control unit.

22. The method according to claim 19, wherein the control unit detects when a threshold value is being exceeded, and wherein a wear display will be activated after a predefined number of times the threshold value has been exceeded.

23. The method according to claim 19, wherein the wear of the cathode is displayed on a display.

* * * * *